No. 851,286. PATENTED APR. 23, 1907.
E. GUILLAUME.
PROCESS FOR THE EXHAUSTION OF HEAD PRODUCTS IN DISTILLING.
APPLICATION FILED JAN. 21, 1899.
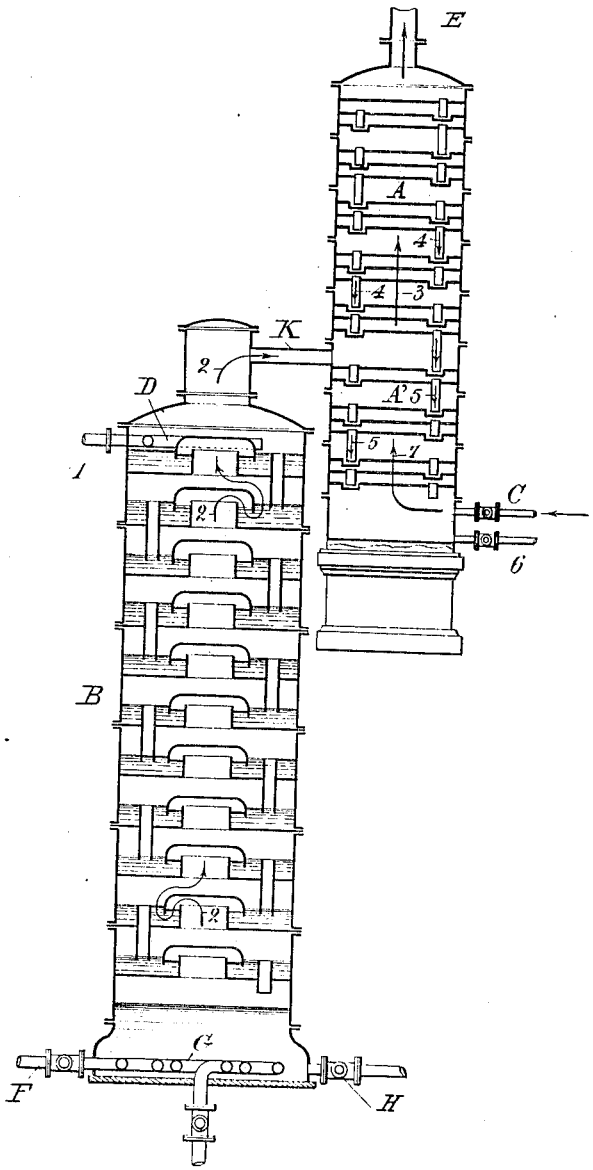
Witnesses
Inventor
Emile Guillaume

UNITED STATES PATENT OFFICE.

EMILE GUILLAUME, OF PARIS, FRANCE.

PROCESS FOR THE EXHAUSTION OF HEAD PRODUCTS IN DISTILLING.

No. 851,286.      Specification of Letters Patent.      Patented April 23, 1907.

Application filed January 21, 1899. Serial No. 702,965.

*To all whom it may concern:*

Be it known that I, EMILE GUILLAUME, a citizen of the French Republic, and a resident of Paris, France, have invented certain new and useful Improvements in Processes for the Exhaustion of the Head Products in Distilling, of which the following is a full, clear, and exact specification.

This invention relates to processes of distilling alcohol and consists in a method continuously producing a high grade alcohol freed from low-boiling impurities in a single distillation; all as more fully hereinafter set forth, matters of novelty being particularly pointed out in the appended claims.

In ordinary alcohol fermentation many bodies besides ethyl alcohol are produced in limited amounts, some being higher boiling, as in the case of the substances lumped together ordinarily under the term "fusel oil," and others lower boiling, as in the case of aldehyde, sundry esters, etc. The ordinary treatment in the ordinary column still is designed to effect the separation of the alcohol from the water and the high boiling constituents, but obviously the lower boiling bodies are separated with the alcohol from which they must subsequently be removed by another operation. Customarily, alcohol and these low boiling impurities, which may be hereinafter called head products simply, for the sake of convenience, are all distilled over together, condensed and then redistilled to get rid of the head products.

It is the object of the present invention to supplement the ordinary fractionation which separates water and high boiling impurities with another simultaneous fractionation removing the head products, producing in one operation a substantially pure ethyl alcohol, avoiding the ordinary condensation and redistillation. For this purpose, the concentrated alcoholic vapors, rich in head products delivered from the outlet of a column still are taken and passed into a separate column still maintained at a temperature sufficient to condense out the alcohol and treated therein in such manner as to condense out the alcohol, retaining the head products in a vapor condition for condensation elsewhere. In other words, while in the primary still alcohol and head products are distilled away from water, etc., in the supplementary or secondary still, the head products are distilled away from the alcohol. The secondary still however must be operated in a somewhat different manner from that customary with column stills since its raw material is introduced in the form of vapor instead of the form of liquid. Its internal structure may however be any of those well known in this class of apparatus. The ordinary cup and plate structure is quite suitable. In any column still, the liquid on the successive plates going downward is progressively richer in the less volatile constituent of the mixture under treatment, while going upward the liquid is progressively richer in the more volatile. For this reason, it is preferred to introduce the incoming alcoholic vapors into the supplementary still at a relatively elevated point in its height, say about midway, thereby making the liquid in the plates above this point richer in head products than the incoming vapors while the liquid on the plates below will be less rich until at the bottom of the still the liquid will be alcohol free from head products. It would be inadvisable to introduce the incoming vapors into the base of the still since the descending purified alcohol would be contaminated thereby with head products.

In the described method of operation, introducing comparatively hot vapors into a column still it is obvious that more or less cooling is requisite. This cooling in practice is usually furnished by the skin cooling of the secondary still. It is also obvious that the ordinary differential heating must be present the base of the column being warmer than the top. This effect is obtained in some degree by the described method of introducing the hot vapors midway of the still, but it is desirable to reinforce the same by the addition of heat at the bottom of the still, this being done in practice by the use of steam, either as coil steam or free steam, as from a perforated coil at the bottom of the still. Heating vapors such as alcoholic vapors may also be used, but with a perforated coil, it is obvious that they must be free from head products, since otherwise the descending purified alcohol would be again contaminated. Where steam is used the dilution resulting is not great, steam having a much higher latent heat than alcohol vapors. The said additional heating has for its purpose to effect a partial distillation of the liquid on the plates situated between the bottom of the still and the point at which are introduced the incoming alcoholic vapors into the said still, in order to completely remove from the said liquid, the head products which are retained in the same.

In the accompanying illustration is shown, more or less diagrammatically, one type of apparatus of the many adapted to perform the process of the present invention.

In the drawing, B represents as a whole the primary still of any form adapted to deliver comparatively concentrated and pure alcohol vapors. As shown, it is an ordinary fractionating column still provided at its top with an inlet pipe 1 and distributer D for the liquid to be distilled and at its base an outlet H for dealcoholized liquid, and a heating steam coil G, fed by valved pipe F. The course of the vapors through the still is shown by arrows 2. The still is provided with the usual cross plates. A–A' represent as a whole the secondary still, here also shown as an ordinary type of column still so far as the internal structure is concerned. Alcohol vapors from the primary still B are introduced through pipe K into the secondary still at a point here shown as about midway the height of the latter. The particular point however will depend to some extent upon the average richness of the alcohol vapors which are to be treated. The still is provided with a vapor outlet E leading to a condenser (not shown) of any and well-known kind. The working of this condenser has for its result to condense completely the vapour of alcohol which arise to the top of the secondary still, while the vapours of the head products resist and are most difficultly condensed. The bottom chamber of the column is provided with pipe C for introducing heating vapors or steam and outlet 6 for withdrawing the purified alcohol. Arrows 4 show the downward course of the condensate above the alcohol inlet K; arrows 5, its course below that point. Arrows 3 and 7 respectively show the upward course of vapor.

The amount of steam or heating vapors introduced at the base of the secondary still should of course be only that which is required to keep the temperature at that point near but below the boiling point of the alcohol.

The operation of the apparatus is apparent from the foregoing. Beer, wine, whisky, or other alcoholic liquid is introduced into the top of the primary still in the usual manner and flows downward against the ascending vapors, reaching the base of the still free from alcohol, and bodies of low boiling point. The rich vapors of alcohol etc., leave the apparatus and enter the secondary still through K, and pass upwards through the plates above the inlet, alcohol condensing out and head products, that is to say aldehyde and other low boiling bodies volatilizing in its lieu until from the top of the still vapors leave which are rich in these volatile impurities and contain comparatively little alcohol. The alcohol passing through the plates below the inlet becomes progressively richer and hotter, losing all its low boiling impurities before the bottom chamber is reached and being drawn off thence as pure ethyl alcohol.

To recapitulate, my invention consists in preparing alcohol vapors substantially free from high boiling constituents in an ordinary column still or similar device; passing these vapors into a secondary still, condensing out the alcohol therefrom and passing onward the vapors of lower boiling bodies for subsequent condensation.

What I claim is:

1. The process of preparing alcohol which consists in forming concentrated alcohol vapors, condensing the alcohol by passing such vapors into a column still, in said column still boiling out the vapors of low-boiling head products for condensation elsewhere, and removing the purified alcohol from the base of the still.

2. The process of preparing alcohol which consists in fractionating alcoholic liquids to produce concentrated alcoholic vapors, condensing the alcohol by passing the vapors into a column still, in said column still boiling out the vapors of low boiling head products for condensation elsewhere, using a small and regulated admission of steam for such boiling, and removing the purified alcohol from the base of the still.

3. The process of preparing alcohol which consists in fractionating alcoholic liquids to concentrated alcoholic vapors in a column still, condensing the alcohol by passing said vapors into a second column still, in said second column still boiling out the vapors of low-boiling head products for condensation elsewhere, and removing the purified alcohol from the base of said second column still.

4. The process of preparing alcohol which consists in fractionating alcoholic liquids to concentrated alcoholic vapors in a column still, introducing said vapors into a second column still at a point about midway its height and therein condensing the alcohol and boiling out vapors of low-boiling head products for condensation elsewhere, and removing the purified alcohol from the base of said second still.

5. The process of treating concentrated alcoholic vapors which consists in introducing them into a column still at a point about midway its height, introducing a small but regulated amount of heating vapor into the base of the still in quantity sufficient to boil out vapors of low-boiling head products from the condensing alcohol, and removing the purified, condensed alcohol from the base of the still.

6. The process of treating concentrated alcoholic vapors which consists in introducing them into a column still at a point about midway its height, introducing a small but regulated amount of steam into the base of the still in quantity sufficient to boil out vapors of low-boiling head products from the condensing alcohol, removing such vapors from the head of the still and removing condensed, purified alcohol from the base of the still.

In witness whereof I have hereunto set my hand in presence of two witnesses.

EMILE GUILLAUME.

Witnesses:
 EDWARD P. MACLEAN,
 JULES FAYOLLET.